United States Patent [19]
Katayama et al.

[11] Patent Number: 5,889,810
[45] Date of Patent: Mar. 30, 1999

[54] APPARATUS FOR PREHEATING AND MELTING OF SCRAP AND PROCESS FOR THE SAME

[75] Inventors: Hiroyuki Katayama; Kenro Sato; Akio Kasama; Yasushi Okumura, all of Futtsu; Yoji Demoto, Kimitsu; Shinya Kitamura; Toshiya Harada, both of Futtsu, all of Japan

[73] Assignee: Nippon Steel Corporation, Tokyo, Japan

[21] Appl. No.: 750,448

[22] PCT Filed: Mar. 27, 1996

[86] PCT No.: PCT/JP96/00804

§ 371 Date: Nov. 26, 1996

§ 102(e) Date: Nov. 26, 1996

[87] PCT Pub. No.: WO96/30709

PCT Pub. Date: Mar. 10, 1996

[30] Foreign Application Priority Data

Mar. 31, 1995 [JP] Japan .................................. 7-076820
Mar. 31, 1995 [JP] Japan .................................. 7-076836
Mar. 31, 1995 [JP] Japan .................................. 7-076837

[51] Int. Cl.⁶ .................................................. F27D 13/00
[52] U.S. Cl. .................................... 373/80; 373/8; 373/78
[58] Field of Search .................................. 373/80, 81, 82, 373/43, 78, 8

[56] References Cited

U.S. PATENT DOCUMENTS

| | | | |
|---|---|---|---|
| 1,034,747 | 8/1912 | Weeks | 75/10.34 |
| 1,421,185 | 6/1922 | Driscoll | 373/80 |
| 1,819,239 | 8/1931 | Greene | 373/80 |
| 3,171,878 | 3/1965 | Burke | 373/80 |
| 3,441,651 | 4/1969 | Viens et al. | 373/81 |
| 3,789,126 | 1/1974 | Brusa | 373/81 |
| 3,900,696 | 8/1975 | Tress et al. | 373/80 |
| 3,976,472 | 8/1976 | Linder | 75/11 |
| 4,280,836 | 7/1981 | Maeda | 373/80 |
| 4,478,574 | 10/1984 | Okuno et al. | 373/80 |
| 4,611,339 | 9/1986 | Saitoh . | |
| 4,852,858 | 8/1989 | Weber . | |
| 5,513,206 | 4/1996 | Mori et al. | 373/81 |

FOREIGN PATENT DOCUMENTS

| | | |
|---|---|---|
| 161950 | 11/1985 | European Pat. Off. . |
| 596728 | 5/1994 | European Pat. Off. . |
| 646757 | 4/1995 | European Pat. Off. . |
| 2328046 | 5/1977 | France . |
| 62-250110 | 10/1987 | Japan . |
| B-6-46145 | 6/1994 | Japan . |
| A-6-228662 | 8/1994 | Japan . |
| 7-332874 | 12/1995 | Japan . |
| 1362167 | 7/1974 | United Kingdom . |
| WO9424506 | 10/1994 | WIPO . |

OTHER PUBLICATIONS

"Strategy of Electric Furnace in Common Steel," Shiraishi Memorial, Lecture Sponsored by J.I.S.I., Japan, Nov. 1994.
"Scrap Melting Process of Converter Type", vol. 78, No. 4, p. 520, Journal Of J.I.S.I., Apr. 1992.

*Primary Examiner*—Teresa Walberg
*Assistant Examiner*—Quang Van
*Attorney, Agent, or Firm*—Kenyon & Kenyon

[57] ABSTRACT

A preheating and melting apparatus for scrap, for preheating and melting the scrap highly efficiently, includes a scrap melting furnace having a top blowing lance and an electric arc heater and a preheater for introducing an exhaust gas generated from the melting furnace and preheating the scrap. The scrap preheater is a shaft furnace and a rotary furnace is disposed at the bottom portion of the shaft furnace to continue the shaft furnace. The scrap discharged from the shaft furnace is transferred into the rotary furnace and it is then charged into the scrap melting furnace.

17 Claims, 4 Drawing Sheets

APPARATUS FOR PREHEATING AND MELTING OF SCRAP AND PROCESS FOR THE SAME

FIELD OF THE INVENTION

The invention relates to an apparatus for preheating and melting scrap, specifically in which the scrap is charged into a melting furnace and melted by electric arc heating or top blown oxygen after the scrap is preheated by a shaft furnace and a rotary furnace disposed continuously with the melting furnace.

BACKGROUND OF THE INVENTION

An amount of heat energy is required when scrap as an iron and steel source is preliminarily preheated or conducted to any preliminary heating process. For the reason mentioned above, even if the scrap is conducted to any process of heating, the running cost for heating does not enjoy any merit, and it also requires an expensive investment to construct the heating apparatus.

Recently, the position of scrap as an iron and steel source has become more important from the viewpoint of recycling of resources. Therefore, research and development into the preheating and melting process of the scrap, which is advantageous for reducing the total heat energy required in the melting and refining thereof, is required so that the recycling of the scrap is efficiently conducted so as to effectively utilize it as an iron and steel source, and furthermore the reduction of heat energy is advantageously attained.

As a prior art in the technical field in scrap melting, "Electric Furnace", (published by Japan Iron and Steel Institute, No. 27, 28 Shiraishi Memorial Lecture "Strategy of Electric Furnace in Common Steel", November, 1994) discloses that the scrap melting increases the running cost of steel making due to high consumption of electric power, and this is attributed to reduction of heat efficiency after the flat bath stage (melt down stage). Furthermore, as a scrap melting process of a converter type, "Iron and Steel" (vol. 78 (1992), p520, published by Japan Iron and Steel Institute) discloses that the construction cost of the apparatus to treat an amount of an exhaust gas increases, and a converter is required after the melting process because the resultant hot metal is molten iron. U.S. Pat. No. 4,852,858 discloses a method for preheating of scrap with an exhaust gas of a refining furnace in which a shaft vessel for holding a raw material is disposed at the upper portion thereof. However, the technology is difficult to control so that the range of the refining condition becomes large. As a result, stabilization of product quality cannot sufficiently be obtained. As another shaft-type preheating furnace, Japanese Examined Patent Publication No. 6-46145 discloses that, although a high heat efficiency can be attained, the scrap fuses due to exposure to high temperature gas at the furnace bottom, with the result that the fused scrap requires oxygen cutting. The prior art furthermore discloses that the charging ratio and the heat efficiency decreases to ensure a space for a fire grate. As a rotary kiln for scrap preheating, Japanese Unexamined Patent Publication No. 6-228662 discloses that heat efficiency decreases due to a low charging ratio of the scrap although the scrap is difficult to fuse due to the usual rotation and transferring thereof. On the other hand, scrap containing no organic substance is ordinarily heated, with the result that the cost increases due to a requirement on scrap selection.

Hereafter, the important problem is to treat a gas containing dioxin generated at the time of preheating scrap containing organic substances such as vinyl chloride. It becomes very advantageous in the utilization of the scrap to solve the problem mentioned above. Therefore, research and development of an apparatus and method for processing a exhaust gas while preheating the scrap is required.

SUMMARY OF THE INVENTION

The problems of scrap preheating in a conventional method, as mentioned above, is that, in the melting furnace disposed the scrap preheating apparatus of the shaft type, the scrap fuses in the scrap preheating apparatus and the scrap cannot be smoothly charged into the melting furnace, and in the rotary kiln the heat efficiency is low due to the small charging ratio. Furthermore, the problems in the conventional melting furnace is low heat efficiency in the electric furnace after the melt down stage, and processing of an amount of the exhaust gas is required in the converter type furnace, and a decarburization furnace is required in a subsequent process because the resultant substance is molten iron.

In view of the state of the art described above, the present invention aims at providing an efficient preheating and melting apparatus, and a process for scrap capable of efficiently melting and decarburizing the scrap and of economically producing a molten steel.

Furthermore, in melting the scrap, dioxin caused by mixed vinyl chloride, etc., in the scrap can be emitted, and can cause problems of environmental pollution. The present invention provides a preheating and melting apparatus and a method in which an exhaust gas processing technology can be attained so that dioxin emitted at scrap heating is capable of sufficiently being treated.

The gist of the present invention which solves the above problems is as follows.

(1) A preheating and melting apparatus for scrap consisting of a scrap melting furnace charging a preheated scrap as a main raw material, a preheater for preheating scrap by introducing an exhaust gas generated from the melting furnace, and an exhaust gas treatment equipment for processing an exhaust gas after preheating, characterized in that the scrap preheater is a shaft furnace, a rotary furnace is so disposed on the furnace bottom side of the shaft furnace as to continue the shaft furnace, and after the scrap discharged from the shaft furnace is transferred through the rotary furnace at a constant rate, the scrap is charged into the scrap melting furnace.

(2) A preheating and melting apparatus for scrap according to (1), wherein a pusher for pushing the scrap discharged from the shaft furnace into the rotary furnace is disposed on the furnace bottom side of the shaft furnace.

(3) A preheating and melting apparatus for scrap according to (1), wherein a fire grate for providing the scrap discharged from the shaft furnace into the rotary furnace is disposed on the furnace bottom side of the shaft furnace.

(4) A preheating and melting apparatus for scrap according to (1), wherein a lance or a tuyere as the means of introducing oxygen is disposed in the melting furnace.

(5) A preheating and melting apparatus for scrap according to (1), wherein the melting furnace is an electric furnace.

(6) A preheating and melting apparatus for scrap according to (1), wherein the melting furnace is a oxygen top blown furnace.

(7) A preheating and melting apparatus for scrap according to (1), wherein a combustion tower for decomposing dioxin in the exhaust gas, a cooling tower for cooling a combustion exhaust gas and a dust collector are disposed in the exhaust gas treatment equipment.

(8) A preheating and melting apparatus for scrap according to (1), wherein the dust collector is a dry dust collector.

(9) A preheating and melting apparatus for scrap according to (1), wherein an exhaust gas processing route by which the preheater connects directly with the dust collector through a cooling tower is further disposed in the exhaust gas treatment equipment so that the exhaust gas emitted from the preheater is directly processed.

(10) A preheating and melting apparatus for scrap according to (1), wherein an exhaust gas processing route by which the melting furnace connects directly with the exhaust gas treatment equipment is further disposed in the exhaust gas treatment equipment so that the exhaust gas emitted from the melting furnace is directly processed.

(11) A process for preheating and melting scrap utilizing an exhaust gas generated at the time of melting preheated scrap as a main raw material in a melting furnace, obtaining a molten iron, and treating an exhaust gas after preheating, is characterized in charging a scrap from top side of a rotary furnace disposed as to continue the melting furnace and a shaft furnace disposed as to continue the rotary furnace, providing the exhaust gas of the melting furnace from bottom side thereof, preheating the scrap in the shaft furnace while maintaining a temperature at a bottom side outlet of the shaft furnace in the temperature range less than the temperature of occurrence of fusion on the scrap surface, after that continuously preheating the scrap in the rotary furnace while maintaining a temperature at an outlet of the rotary furnace in the temperature range not less than the temperature of occurrence of fusion on the scrap surface, and providing the scrap into the melting furnace.

(12) A process for preheating and melting scrap according to (11), wherein, while processing the exhaust gas, the exhaust gas is heated with combustion to not less than 800° C. and up to 500 ppm of CO gas concentration in the combustion tower, and further the exhaust gas is cooled with water at a rate not less than 800° C./sec to the temperature range of from 150° to 200° C. in which the exhaust gas is in state without dewing after cooling.

(13) A process for preheating and melting scrap according to (11), wherein, while processing of the exhaust gas after preheating, the exhaust gas emitted from the preheater is introduced into the dust collector after the exhaust gas is cooled to up to 100° C. in the cooling tower.

(14) A process for preheating and melting scrap according to any of (11) to (13), wherein the preheated scrap with the exhaust gas of the melting furnace in a previous charge is used in an amount of 30 to 70% of total scrap, an electrode is inserted into the melting furnace and melting the scrap is started after the preheated scrap is piled in the melting furnace, and after that the remainder of the scrap is continuously charged from the rotary furnace into the melting furnace.

(15) A process for preheating and melting scrap according to any of (11) to (14), wherein the molten steel is produced by the steps of starting to melt a scrap after being piled in the melting furnace, the electrode withdrawn from the melting furnace when the scrap forms a flat bath state, or at least 40% of the scrap melted and a top of the scrap disappears under the melt in the melting furnace, after that starting to blow oxygen from a lance or tuyere instead of the electrode, melting the remainder of solid scrap while adding a carbon material, stopping then the supply of the carbon material, and continuously conducting decarburization by blowing oxygen.

(16) A process for preheating and melting scrap according to (11) or any of (13) to (15), wherein the scrap containing an organic material kept at up to 100° C. is charged into the melting furnace kept at not less than 1,300° C., and an exhaust gas emitted the melting furnace is recovered in a non combusting state.

(17) A process for preheating and melting scrap according to any of (11) to (16), wherein the dust concentration before the collector of the exhaust gas treatment equipment is 40 to 400 g/Nm$^3$.

BEST MODE FOR CARRYING OUT THE INVENTION

Figure 1:
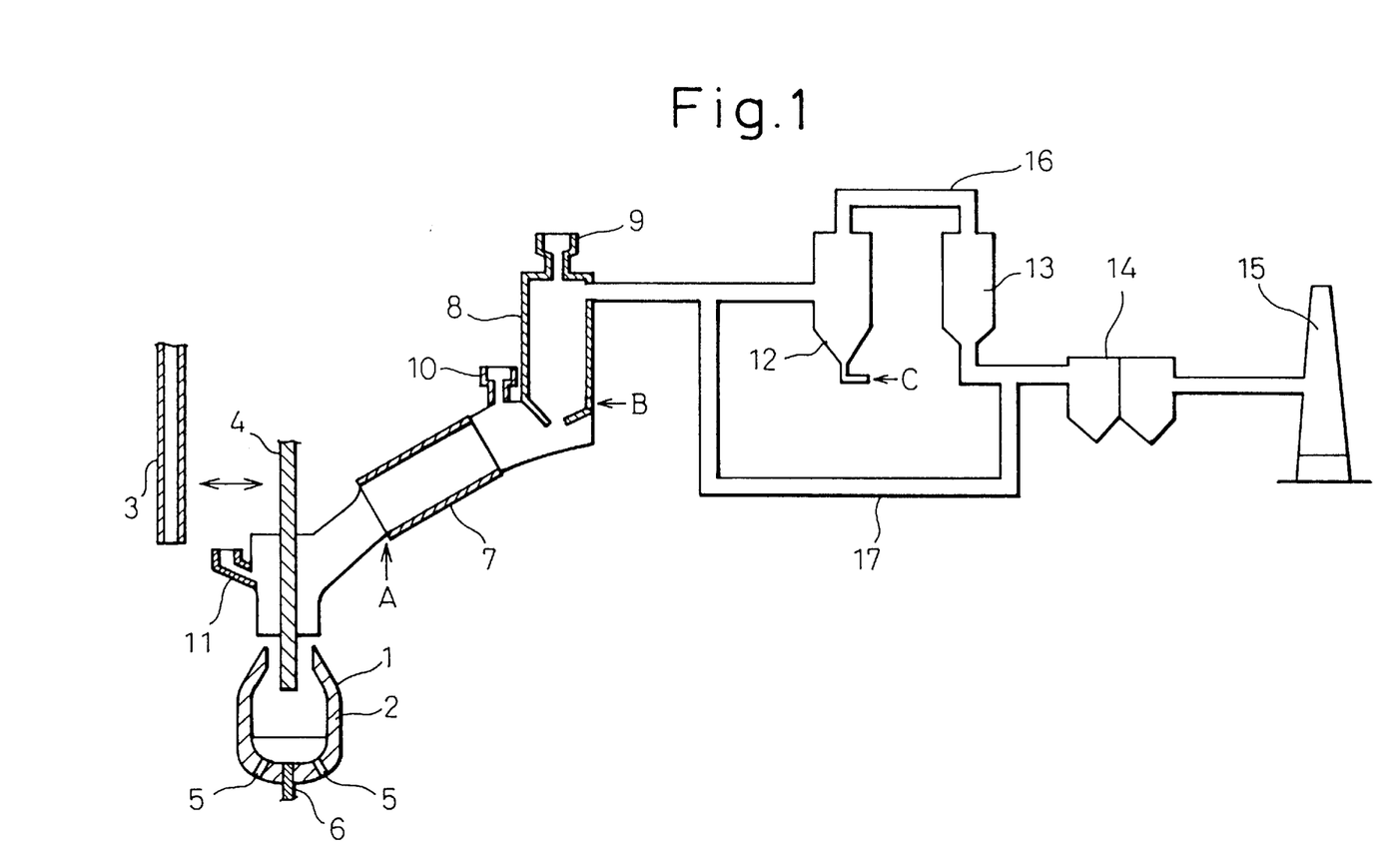
FIG. 1 is a flow diagram illustrating a total preheating and a melting apparatus for scrap according to the invention.

FIG. 1 shows an example of a preheating and melting apparatus for scrap for execution of the invention. A melting furnace 1 is inner-lined with a refractory 2, and equipped with an electrode 4 inserted from an upper portion or a top blowing lance for blowing an oxygen-containing gas. A bottom blown tuyere 5 and a furnace bottom electrode 6 are equipped in the furnace bottom. At the upper portion of the melting furnace, a rotary furnace 7 and a shaft furnace 8 as preheaters are equipped as to continue the rotary furnace to preheat the scrap due to introduction of an exhaust gas emitted from the melting furnace. The scrap charging can be divided into two routes, i.e. one which is charged into the melting furnace 1 from a scrap charging hole 9 through the rotary furnace 7 after preheating with the shaft furnace 8, the other which is charged into the melting furnace 1 from a scrap charging hole 10 through the rotary furnace 7. Furthermore, the scrap can also be charged into the melting furnace 1 from a scrap charging hole 11 without passing the preheater. CO gas in an exhaust gas can be burnt with air taken into the inlet A of the rotary furnace and the inlet B of the shaft furnace. The exhaust gas through the preheaters is cooled in a cooling tower 13 through a passage system 16 after burning with air which is taken into a combustion tower 12, or is, in a passage system 17, emitted to the air from a funnel 15 after dust is collected with a dry dust collector 14 without passing the combustion tower 12 and cooling tower 13.

In the combustion tower, dioxin can completely be decomposed by burning and heating the exhaust gas so that the temperature must be at least 800° C. and the CO concentration must be up to 1%. When the temperature is lower than 800° C., the reaction rate is so slow that the decomposition cannot be sufficiently advanced. When CO concentration is higher than 1%, the combustion is so insufficient that the decomposition cannot be sufficiently advanced. In the operation of the preheaters, the operation on the previous charge is conducted and the scrap is preheated while the scrap equivalent to 30 to 70% of the total scrap amount is charged into the shaft furnace 8, and then the previous charge is tapped. Subsequently, after the scrap is piled in the melting furnace 1 through the rotary furnace 7, the electrode 4 is inserted and melting of the scrap is started. After that, the remainder of the scrap is continuously charged into the melting furnace through the scrap charging hole 10 of the rotary furnace 7 or the scrap charging hole 11 of the melting furnace 1 jointly with charging and preheating the scrap of a next charge through the scrap charging hole 9 in the shaft furnace 8. After the scrap is piled in the melting furnace, melting the scrap is started by the electrode 4. Then, at the time when the scrap forms a flat bath or the top of the scrap disappears under the melt so that a solid scrap cannot cover the surroundings of the electrode, the electrode 4 is withdrawn outside the furnace. Instead of the electrode, the top blowing lance 3 is inserted into the furnace, and blowing oxygen is started. After melting the remainder of the solid scrap while adding a carbon material, charging the carbon material is stopped, and subsequently a molten steel can be produced due to decarburization by blowing oxygen.

Figure 2:
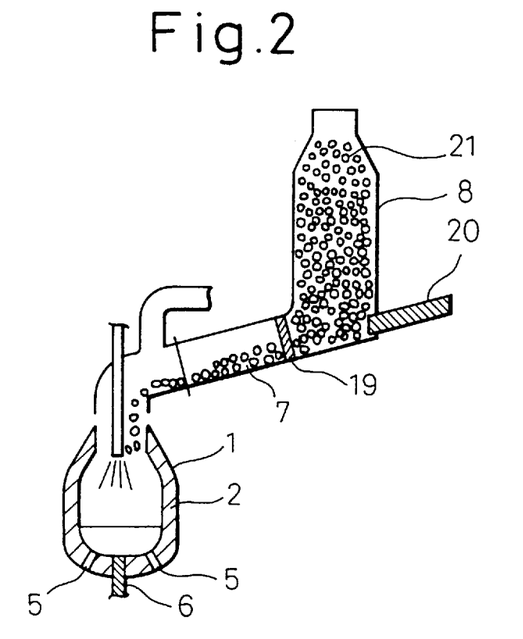
FIG. 2 is a diagram illustrating an outline of a preheater according to the invention.

FIG. 2 shows an embodiment of the present apparatus. In the drawing, reference numeral 8 denotes a scrap preheating shaft furnace, reference numeral 1 denotes a scrap melting furnace equipped with a top blowing lance for blowing an oxygen-containing gas, and reference numeral 7 denotes a rotary furnace disposed between the shaft furnace 8 and the scrap melting furnace 1 such as a rotary kiln.

Figure 3:
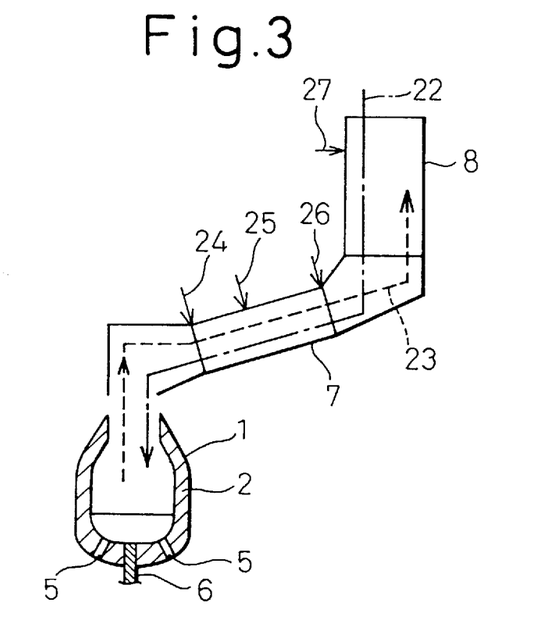
FIG. 3 is an explanatory diagram illustrating an exhaust gas recycling system of an apparatus according to the invention.
Figure 4:
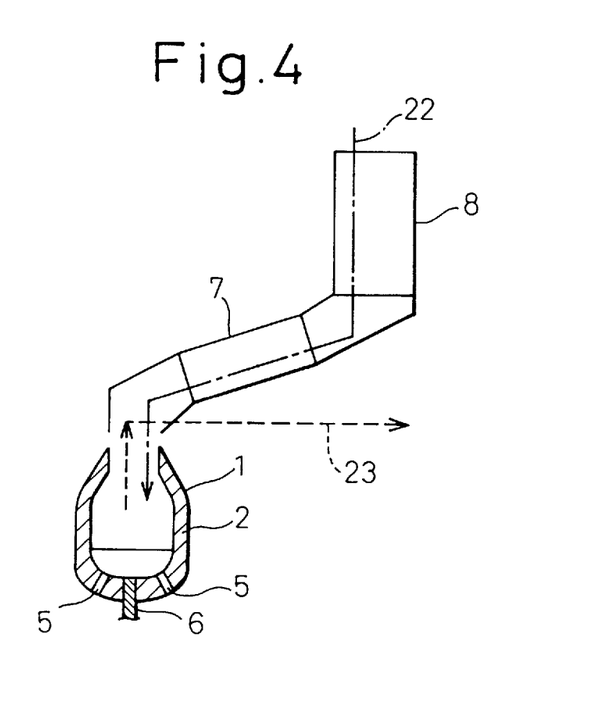
FIG. 4 is an explanatory diagram illustrating an another exhaust gas recycling system of an apparatus according to the invention.

The scrap packed into the shaft furnace 8 is preheated by introducing the gas generated from the scrap melting furnace 1 into the shaft furnace by passing or not passing the gas through the rotary kiln. FIG. 3 shows an embodiment of the exhaust gas recycling system according to the present apparatus. In the exhaust gas passage 23 facing the scrap passage 22, air for burning is supplied from reference numeral 27 in the shaft furnace 8 and from reference numerals 24 to 26 in the rotary kiln 7, and the gas is completely burnt. FIG. 4 shows an another embodiment of the present exhaust gas recycling system. In the recycling system, the exhaust gas 23 against the scrap passage 22 is directly supplied to the dust collector through the gas cooler without passing the rotary kiln 7 or shaft furnace 8. More concretely, the resulting gas from the melting furnace 1 is completely burnt through the rotary kiln 7 and is then introduced into the shaft furnace 8 as shown in FIG. 3, or is directly introduced into the shaft furnace 8 from the scrap melting furnace 1 as shown in FIG. 4.

Figure 5:
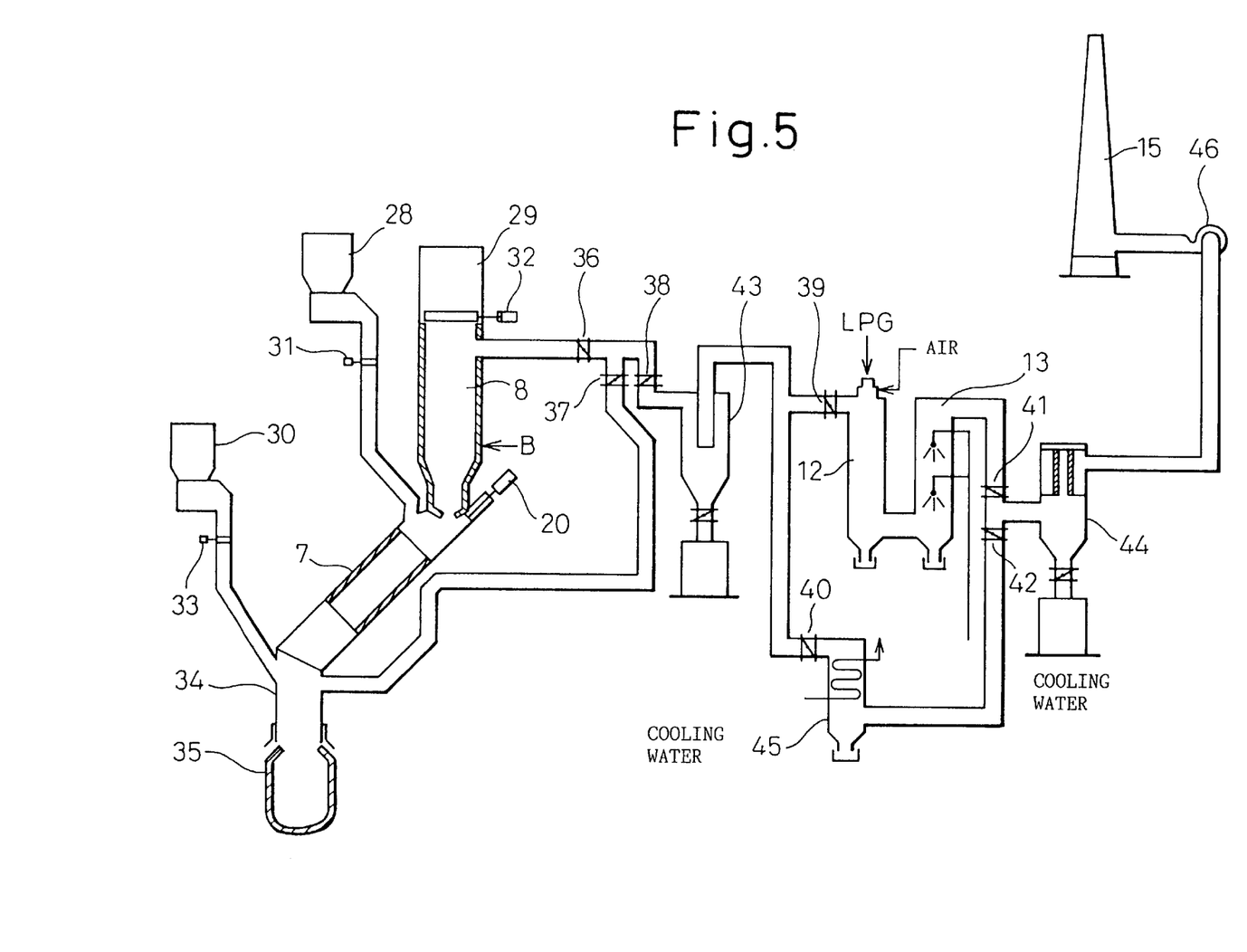
FIG. 5 is an explanatory diagram illustrating an exhaust gas treating route of a preheating and melting apparatus in the example according the invention.

FIG. 5 shows a explanatory diagram of the exhaust gas processing route for directly treating exhaust gases after preheating the scrap and being emitted from the melting furnace in the present preheating and melting apparatus for execution of the invention.

In this drawing, when dioxin is decomposed by burning and cooling the exhaust gas after opening the gate valves 36, 38, 39 and 41, and closing the gate valves 37, 40 and 42, the two cases are that one is the case in which the scrap is supplied from both scrap hoppers 28 and 29, and the other is the case in which the scrap is supplied only from the scrap hopper 29 while closing the shutter 31. Opening the gate valves 37, 38, 40 and 42, and closing the gate valves 36, 39 and 41, and as a result the passage, is a way to collect the dust adsorbing dioxin after cooling. In this case, the scrap is supplied only by the scrap hopper 29 while closing the shutter 31, or directly supplied to the melting furnace from the scrap hopper 30.

Furthermore, when the dust concentration is low, the dust concentration can be increased by charging a powder coal, a powder lime, etc., in the secondary dry dust collector 44. Here, the dust concentration is a total concentration of the dust generated in the previously mentioned melting furnace and the preheater, and the charged powder substance. Furthermore, in FIG. 5, numerals 32 and 33 show shutters, numerals 34 and 35 show a water-cooled hood and a melting furnace respectively, numeral 43 shows a primary dry dust collector, numeral 45 shows an exhaust gas cooling tower, numeral 46 shows an I.D.F. (induced draft fan).

Whenever necessary, a pusher or fire grate 20 is preferably disposed at the lower part of the shaft furnace. This pusher or fire grate is used for smoothly charging the scrap from the shaft furnace into the rotary furnace and for preventing the scrap remaining inside the rotary furnace.

The reason why the present invention uses the shaft type furnace for the preheater is because it has the highest preheating efficiency among the existing preheating furnaces. The reason why the rotary furnace is interposed between the shaft furnace and the melting furnace is because the temperature at the lower portion of the shaft furnace is kept at a low level by ensuring a combustion space of the resulting gas from the scrap melting furnace and the highest preheating temperature of the scrap is raised above 800° C. at which fusing takes place.

Both the converter and the electric furnace can be used as the scrap melting furnace. When the converter is used, the exhaust gas can be recovered while keeping CO therein since an amount of the exhaust gas can be generated and therefore the preheating is sufficiently conducted by the sensible heat of the gas. In the case of the electric furnace, although a small amount of the exhaust gas is almost completely burnt to $CO_2$ in the preheating process, it has a merit that the apparatus investment is decreased due to the small size thereof.

The size of the scrap charged into the scrap preheating furnace is set to be not greater than ⅓ of the inner diameter of the shaft furnace or the rotary furnace. The lower limit is such that gas permeability of the shaft surface can be ensured, and the grain diameter is about 30 mm.

The refining furnace used in the present invention preferably is a refining furnace which can be used as an electric furnace and a converter, and a scrap charged into the refining furnace is melted by arc heating using an electrode, the molten steel obtained by melting the scrap by arc heating is decarburized by oxygen blowing inside this refining furnace to produce a molten steel.

Power efficiency is not lower than 95% when the pile of the scrap is melted by the electrode. As melting proceeds, however, the lower end of the electrode comes into contact with a liquid (molten steel) and unmelted scrap no longer exists above the liquid surface. It has been confirmed that power efficiency drops below 45% at this time. Therefore, the present invention improves energy efficiency by using electric power while the solid scrap keeps a direct contact with the electrode and by using oxygen and a fossil fuel when they no longer keep the direct contact.

According to a further improvement method, when the scrap is melted in advance by electric power in the state of a flat pile, the portion of the scrap which is at first in contact with the electrode is melted, and only the center portion of the pile of the scrap is melted in such a manner as to bore a hole, and at least 40% of the scrap under this state is melted by electric power. If the molten metal obtained by melting of at least 40% of the scrap in this way has a sensible heat having a temperature higher than the melting point, the scrap can be melted within a short time by a mass slag melting method, in particular, which is proposed by the Applicant of the present invention (Japanese Unexamined Patent Publication (Kokai) No. 2-141511) even when the melting operation shifts to melting using oxygen and a fossil fuel. By the way, the energy efficiency of this melting method has been confirmed to provide an improvement of about 20% in comparison with the prior art method.

The reason why the temperature of the scrap melting furnace is kept at a temperature not lower than 1,300° C. in the present invention is because the highest boiling point of dioxin is lower than 1,300° C., and when dioxin are momentarily heated to this temperature, they undergo thermal decomposition. For this reason, the temperature is stipulated to not lower than 1,300° C.

The reason why the dust concentration upstream of the dust collector is limited to the range of 40 to 400 $g/Nm^3$ is as follows. If the dust concentration is lower than 40 $g/Nm^3$, dioxin generated by thermal decomposition cannot be adsorbed completely, and if the dust concentration is excessively high, on the other hand, a load to a dust collection system of a melting apparatus becomes great, and the problem of environmental pollution is likely to develop. Since the concentration of about 400 $g/Nm^3$ is the limit, the upper limit of the concentration is limited to 400 $g/Nm^3$.

The temperature of the exhaust gas from the melting furnace is from 1,300° to 2,500° C. and is sometimes higher than this range on the high temperature side. The reason why the dust in the exhaust gas can adsorb dioxin may be that dioxin is adsorbed with the iron powder of the dust at high temperature, since dioxin originally is a vaporizable organic material. Furthermore, it is considered that a part of the organic material can dissolve and react in combination with the dust component. Chlorine is considered to generate HCl by combining with H.

The exhaust gas containing dioxin simultaneously includes an organic gas caused by vinyl chloride, etc. The kinds of the organic material are the combination of benzene, toluene, xylene, styrene, naphthalene, phosgen, etc., that are bonded to one another.

Those can be removed simultaneously in the present process while removing dioxin since their boiling point is almost equal to that of dioxin.

EXAMPLE

Example 1

A cylindrical rotary furnace (rotary kiln) having inner diameter: 1.5 m, length: 8 m, and inclined angle: 6.5°, was disposed in connection with an upper water cooled hood in 20 t top blown converter, and further a shaft furnace having inner diameter: 1.5 m and packed layer height: 3.5 m, was disposed in connection with the upper portion of the rotary furnace. In the converter, oxygen was blown into a molten iron at about 1,500 $Nm^3/Hr$ while agitating the molten iron with the bottom blown gas, and simultaneously continuously adding coke so that the scrap was melted by the combustion heat of the coke.

The exhaust gas containing 50 to 60% of the generated CO was introduced to the rotary furnace passing through the upper water cooled hood, and a part of the CO gas was burnt to $CO_2$ by air at an inlet of the rotary furnace so that the scrap was preheated thereby.

The rotation number of the rotary furnace was about 2.5 rpm and the charging rate of the scrap into the converter was about 20 ton/Hr. In the bottom portion of the shaft furnace, a fire grate to charge a constant amount of the preheated scrap and a pusher to wipe out the scrap to the rotary furnace were disposed. The average temperature of the scrap immediately before charging to the converter was 300° to 600° C. In a result, the carbon material unit consumption in the converter was about 120 kg/t compared with about 175 kg/t in a case of no preheating.

Example 2

A cylindrical rotary furnace (rotary kiln) having inner diameter: 1.5 m, length: 8 m, and inclined angle: 6.5°, was disposed in connecting with 20 t electric furnace, and further a shaft furnace having inner diameter: 1.5 m and packed layer height: 3.5 m, was disposed in connection with the upper portion of the rotary furnace. In the electric furnace, electric heating was conducted and, jointly with that, oxygen was blown to the molten iron at about 500 $Nm^3/Hr$ from a tuyere and a top blowing lance from outside, and simultaneously continuously adding about 70 kg/t of a fine powder coal so that the scrap was melted by the electric heating and the combustion heat of the carbon material.

The exhaust gas containing 50 to 60% of the generated CO was introduced to the rotary furnace passing through the upper water-cooled hood, and a part of the CO gas was burnt to $CO_2$ by air at an inlet of the rotary furnace so that the scrap was preheated thereby.

The rotation number of the rotary furnace was about 2.5 rpm and the charging rate of the scrap into the electric furnace was about 20 ton/Hr. In the bottom portion of the shaft furnace, a fire grade to charge a constant amount of the preheated scrap and a pusher to wipe out the scrap to the rotary furnace were disposed. The average temperature of the scrap immediately before charging to the converter was 500° to 800° C. and at the outlet of the shaft furnace the temperature was 200° to 400° C. In a result, the electric power unit consumption in the electric furnace was about 200 KWH/t compared with about 390 KWH/t in a case of no preheating.

Example 3

A cylindrical rotary furnace (rotary kiln) was disposed in connection with 20 t electric furnace as in Example 2, and a shaft furnace was disposed in connection with the upper portion of the rotary furnace. In the electric furnace, electric arc heating was conducted and, jointly with that, oxygen was blown to the molten iron at about 500 $Nm^3/Hr$ from a tuyere and a top blowing lance from outside, and simultaneously about 70 kg/t of a fine powder coal was continuously added so that the scrap was melted by the electric heating and the combustion heat of the coal.

The exhaust gas containing 50 to 60% of generated CO was introduced to the rotary furnace passing through the upper water cooled hood, and a part of the CO gas was burnt to $CO_2$ by air at an inlet of the rotary furnace so that the scrap was preheated thereby and further the gas was introduced to the shaft furnace.

A part of the CO was burnt to $CO_2$ by air at the inlet of the shaft furnace so that the scrap was preheated thereby. A half of the scrap was directly charged into the rotary furnace and continuously supplied to the melting furnace while being preheated at 400° to 600° C. The remainder of the scrap was charged into the shaft furnace, and subsequently was charged to the electric furnace passing through the rotary furnace immediately before starting the operation of the next charge after the scrap was usually preheated at 400° to 600° C. passing through the rotary furnace in the electric furnace operation.

The melting rate of the scrap was about 20 ton/Hr, and the electric power unit consumption was about 200 KWH/t compared with about 390 KWH/t in a case of no preheating.

Example 4

A cylindrical rotary furnace was disposed in connection with an upper water cooled hood of a 20 t electric furnace, and further a shaft furnace was disposed in connection with the upper portion of the rotary furnace. In the electric furnace, electric heating was conducted and, jointly with that, oxygen was blown to the molten iron at about 500 Nm$^3$/Hr of the flow rate from a tuyere and a top blowing lance from outside, and simultaneously powder coal was continuously added so that the scrap was melted with electric heating and combustion heat of the coal. The scrap was supplied to the shaft furnace or rotary furnace, and continuously supplied to the electric furnace from the water-cooled hood. The generated exhaust gas was introduced to a dust collector after passing through a gas cooler and being drawn in from a exhaust gas inlet disposed on the side plane of the upper water cooled hood.

Example 5

After 100 tons of a pre-heated scrap was piled in a 100-ton electric furnace a D.C. electrode was inserted from above, and melting of the solid scrap was started after slag making. The top portion of the pile of the scrap was melted and dropped, and the molten metal gathered at the bottom inside the electric furnace. The height of the pile of the scrap decreased with the increase in the melting quantity of the solid scrap, and the electrode was lowered with the decrease of the height of the scrap. When about 60% of the solid scrap became the molten metal, and as the level of the molten metal gradually rose and the pile of the solid scrap fell below the level of the molten metal, the electrode was taken up outside the furnace, and a top blowing lance was instead inserted from above and oxygen was blown at a rate of 10,000 Nm$^3$/h. 40 kg of a carbon material was added from the furnace shoulder portion. The molten metal was heated by the combustion of oxygen and the carbon material, and the solid scrap remaining unmelted at the bottom inside the molten metal was completely melted. Thereafter, charging of the carbon material was stopped but the supply of oxygen was continued. As a result, a molten steel having a carbon concentration of 0.03% could be produced.

Example 6

As in the method of Example 5 described above, the operation was carried out with the exception that the depth of the center of the bottom portion of the 100-ton electric furnace was increased, 50 tons of the pre-heated scrap having a relatively small size was piled on the bottom portion so deepened, and 50 tons of the scrap having the same size was piled around the former into a flat pile.

When about 55% of the solid scrap changed to the molten metal, the electrode was taken up outside the furnace, and oxygen was blown instead from a bottom tuyere and a transverse tuyere at a rate of 2,500 Nm$^3$/h in total, and 40 kg of dust coal was added from the transverse tuyere. The molten metal was heated by the combustion of oxygen and the carbon material, and the solid scrap remaining unmelted at the bottom inside the molten metal was completely melted. Thereafter, charging of the carbon material was stopped but the supply of oxygen was continued. As a result, a molten steel having a carbon concentration of 0.03% could be produced.

Example 7

The center of the bottom portion of a 150-ton electric furnace was deepened. After 100 tons of a preheated scrap having a relatively small size was piled in the bottom portion so deepened and 50 tons of the scrap having a relatively large size was piled flat around the former, the melting operation was carried out after slag making.

When about 40% of the solid scrap was converted to the molten metal, the electrode was taken up outside the furnace, and a top blowing lance was inserted instead from above into the melting furnace, and oxygen was blown to the surface of the molten metal so as to form FeO and at the same time, to raise the temperature. Then, 100 kg of coal dust, in total, was added from a bottom tuyere and a transverse tuyere. The solid scrap that remained unmelted was completely melted and as a result, a molten steel having a carbon concentration of 0.03% could be produced within 30 minutes.

Example 8

Melting and decarburization of a scrap were carried out by using two 150-ton refining furnaces having the same shape and equipped with a furnace bottom electrode of 280 mm$\phi$×2 billets at the bottom thereof, one power source having a transformer capacity of 100 MVA, one electrode of a 30 mm® and one top blowing oxygen lance having an oxygen feed capacity of 25,000 Nm$^3$/h.

While melting of the scrap was carried out by inserting the electrode into the refining furnace A, oxygen was blown into the molten metal, that was melted in advance, inside the refining furnace B. In this way, decarburization and dephosphorization were conducted from a carbon concentration of 3.5% to 0.1% and 0.05% to 0.01%, respectively. After melting was completed in the refining furnace A, the electrode was transferred into the refining furnace B, and the lance of the refining furnace B was transferred into the refining furnace A. These operations were alternately repeated at 20-minute intervals and as a result, a molten steel production speed of 450 ton/h could be obtained.

Example 9

The effect of the experiment was confirmed by an experiment in which the dioxin component can be deliberately formed by the steps of charging the iron scrap into the melting furnace kept at 1,300° C. in the furnace while continuously preheating the scrap at 800° C. in the temperature range with no occurrence of fusion, blowing oxygen of 15,000 Nm$^3$/H from a top blowing lance, charging a coal of 130 kg/t-metal, and melting the scrap at 100 t/H.

Preheating of the scrap in the preheater was conducted by introducing the generated exhaust gas, at a high temperature, from the melting furnace to the preheater and further burning the CO component with ignition (secondary combustion). The exhaust gas emitted from the preheater was introduced to the combustion tower and ignited the exhaust gas at the inlet to heat the gas to 800° C. so that dioxin in the exhaust gas can be thermally decomposed and adsorbed into the dust. Then, the exhaust gas was rapidly cooled to a temperature range of from 150° to 200° C. by a spray cooling tower so that the dioxin component could not be crystallized. The dust, in which the dioxin component is adsorbed and filtered by the bag filter passing through the dry dust collector, can be collected due to the temperature. The melting operation was conducted by keeping the secondary combustion ratio at 60% in the furnace at melting time from the viewpoint of energy efficiency. In the combustion tower, the exhaust gas at a 60% secondary combustion ratio was burnt by a ignition burner disposed in the inlet of the exhaust gas (disposed in the bottom portion of the combustion tower) so that the CO amount in the exhaust gas became 50 ppm. The exhaust gas was heated to 800° C. by the combustion heat at that time.

Then, spray water, from a cooling tower adjoining and connected with the combustion tower, was sprayed onto the exhaust gas to cool the exhaust gas at 150° C./sec, and jointly with that the temperature after cooling was maintained at 150° C. so as to prevent dewing in the dust collector. The exhaust gas was introduced to a dry filter type dust collector while keeping the temperature at 150° C. and the dust was collected. The combustion tower may improve the heat efficiency of the total process by disposing a heat recovery apparatus for recovering the heat of the exhaust gas between the combustion and the water cooling towers. However, due to the heat recovery process, when the total cooling rate is not in the range of from 800° to 10,000° C./sec within the area between the outlet of the combustion tower and the outlet of the water cooling tower through the heat recovery apparatus, it is not preferable since reduction efficiency of the dioxin concentration deteriorates (regeneration thereof increases). The experiment was conducted under various mixing ratios of 20 to 60% shredder scrap and 0 to 60% heavy weight scrap so as to vary the dioxin concentration of the generated exhaust gas in the preheater in the range of from 50 to 200 ng-TEQ/Nm$^3$ and to vary the contained ratio of vinyl chloride (the source of the dioxin component) content compared with the total amount of the scrap charging to the melting furnace. As a result, the dioxin concentration in the exhaust gas after passing the dry dust collector was 5 ng-TEQ/Nm$^3$ compared with the concentration of 100 ng-TEQ/Nm$^3$ before the dust collector when the combustion tower and water cooling tower according to the invention was not used, and therefore the reduction ratio of dioxin was lowered to one twentieth.

Compared with this, in the case of using the combustion and water cooling towers, the dioxin concentration in the exhaust gas after passing the dry dust collector was 0.1 ng-TEQ/Nm$^3$ when the concentration in the exhaust gas at the inlet of the combustion tower was 50 ng-TEQ/Nm$^3$ at the time of mixing 20% of the shredder scrap ratio and 60% of heavy weight scrap ratio, and therefore the reduction ratio of dioxin could be one five hundredth. Furthermore, in the result of raising the combustion temperature in the combustion tower and improving the cooling rate to 2,000° C./sec, the dioxin concentration in the exhaust gas after passing the dry dust collector was 0.1 ng-TEQ/NM$^3$ when the concentration at the inlet of the combustion tower was 200 ng-TEQ/Nm$^3$ at the time of mixing 60% of the shredder scrap ratio, and therefore the reduction ratio of the dioxin could be one two-thousandth.

Example 10

The exhaust gas was emitted from the preheater at 500° to 600° C. and, in the cooling tower, preferably the temperature was lowered to below 100° C., and more preferably below 80° C. and most preferably the temperature was rapidly lowered to 50° C.

The cooling was conducted by the indirect cooling by means in which small-bone tubing (up to 10 mm) was set up around the passage of the exhaust gas to recycle the cooling water, or the water was sprayed from outside the passage of the exhaust gas onto the small-bone tubing which was made of the steel. The merit of the indirect cooling is that it is capable of eliminating removing the dioxin component dissolved in the cooling water which is necessary for direct cooling.

Example 11

While the scrap was directly charged into a melting furnace not having a pre-heating process and having an internal temperature kept at 1,300° C., oxygen was blown from a top blowing lance at a rate of 15,000 Nm$^3$/H, coal was charged at a rate of 130 kg/T of metal and the scrap was melted at a rate of 100 T/H. The resulting exhaust gas was collected by a dry dust collector. The dust concentration upstream of the dust collector was kept at 40 g/Nm$^3$.

As a result, dioxin was adsorbed before passing through the dust collector, and the dust was collected and filtrated by the dust collector.

Example 12

While the scrap was directly charged into a melting furnace not having a pre-heating process and having an internal temperature kept at 1,500° C., oxygen was blown from a top blowing lance at a rate of 10,000 Nm$^3$/H, coal was charged at a rate of 120 kg/T metal and the scrap was melted at a rate of 100 T/H. The resulting exhaust gas was collected by the dry dust collector. The dust concentration upstream of the dust collector was kept at 200 g/Nm$^3$.

As a result, dioxin was adsorbed before passing through the dust collector, and the dust was collected and filtered by the dust collector.

Comparative Example

The scrap was melted at a rate of 100 T/H inside a melting furnace having a pre-heating process for preheating, in advance, the scrap to a temperature not lower than 800° C. by blowing oxygen from a top blowing lance at a rate of 1,000 Nm$^3$/H and charging coal at a rate of 200 kg/T metal. The resulting exhaust gas was collected by the dry dust collector. The generation quantity of the dust was 15 g/Nm$^3$ in terms of the concentration in the exhaust gas in front of the dust collector.

As a result, since dioxin was not sufficiently adsorbed onto the dust before passing the dust collector, the exhaust gas was further completely burnt and rapidly cooled in the cooling tower.

Example 13

Since the temperature of the emitted exhaust gas from the preheater was not less than 500° C., the dioxin component thermally decomposed could be adsorbed by the dust in the exhaust gas. Thus, the exhaust gas was directly introduced from the preheater to the cooling tower. In the cooling tower, the direct cooling was conducted at 900° C./sec cooling rate, and the resultant gas was cooled for 0.5 sec in which the gas temperature fell from 500° C. to 50° C. Therefore, the dioxin component thermally decomposed could be adsorbed by the dust in the exhaust gas.

The dust was filtered by the bag filter of the dry filtration collector.

Example 14

Usually, although the dioxin component is formed and detected, in the preheater that has sometimes existed, in specific cases, in the exhaust gas of the melting furnace (at not less than 1,300° C.). In the present embodiment, the exhaust gas processing equipment was directly connected to the melting furnace to prevent the dioxin existing. Thus, the high temperature exhaust gas containing a large dioxin component was rapidly cooled, and therefore dioxin was adsorbed onto the dust while dioxin was prevented from regenerating. Thus, the resultant dust was filtered and collected.

The exhaust gas was directly introduced from the melting furnace to the cooling tower. In the cooling tower, indirect cooling was conducted at 900° C./sec so that the exhaust gas temperature fell from 500° to 50° C. in 0.5 sec. Thus, the thermally decomposed dioxin component could be adsorbed into the dust in the exhaust gas.

On the other hand, in the preheater, the scrap was preheated, by the indirect preheating method, through the outside wall.

INDUSTRIAL APPLICABILITY

As apparent from the above examples, the elimination of energy and resources can be attained according to the present invention, and preheating, melting and decarburizing of the scrap can be efficiently executed. Accordingly, the present invention will have a tremendous effect on industry.

We claim:

1. A preheating and melting apparatus for scrap comprising a scrap melting furnace for receiving a charge of preheated scrap as a main raw material, a preheater for preheating scrap by introducing an exhaust gas generated from said melting furnace, and an exhaust gas treatment equipment for processing an exhaust gas after preheating, wherein said preheater for preheating scrap is a shaft furnace, a rotary furnace is disposed on the bottom side of said shaft furnace to continue said shaft furnace, and after said scrap discharged from said shaft furnace is transferred through said rotary furnace at a constant rate, said scrap is charged into said scrap melting furnace.

2. A preheating and melting apparatus for scrap according to claim 1, wherein a pusher for pushing said scrap discharged from said shaft furnace into said rotary is disposed on the furnace bottom side of said shaft furnace.

3. A preheating and melting apparatus for scrap according to claim 1, wherein a fire grate for providing said scrap discharged from said shaft furnace into said rotary furnace is disposed on the bottom side of said shaft furnace.

4. A preheating and melting apparatus for scrap according to claim 1, wherein a lance or a tuyere of introducing oxygen is disposed in said melting furnace.

5. A preheating and melting apparatus for scrap according to claim 1, wherein said melting furnace is an electric furnace.

6. A preheating and melting apparatus for scrap according to claim 1, wherein said melting furnace is a oxygen top blown furnace.

7. A preheating and melting apparatus for scrap according to claim 1, wherein a combustion tower for decomposing dioxin in said exhaust gas, a cooling tower for cooling a combustion exhaust gas and a dust collector are disposed in said exhaust gas treatment equipment.

8. A preheating and melting apparatus for scrap according to claim 7, wherein said dust collector is a dry dust collector.

9. A preheating and melting apparatus for scrap according to claim 1, wherein a dust collector is disposed in said exhaust gas treatment equipment, and wherein an exhaust gas processing route by which said preheater connects directly with said dust collector through a cooling tower is further disposed in said exhaust gas treatment equipment so that said exhaust gas emitted from said preheater is directly processed.

10. A preheating and melting apparatus for scrap according to claim 1, wherein an exhaust gas processing route by which said melting furnace connects directly with said exhaust gas treatment equipment is further disposed in said exhaust gas treatment equipment so that said exhaust gas emitted from said melting furnace is directly processed.

11. A process for preheating and melting scrap utilizing an exhaust gas from a melting furnace for preheating scrap, said preheated scrap being a main raw material to be charged into the melting furnace for obtaining molten iron, and treating said exhaust gas after said preheating, said process comprising the steps of:

providing a melting furnace for receiving and melting scrap;

providing a rotary furnace having a bottom side outlet in communication with said melting furnace for charging scrap from said rotary furnace into said melting furnace;

providing a shaft furnace having a bottom side outlet in communication with a top side inlet of said rotary furnace for charging scrap from said shaft furnace into said rotary furnace;

conducting exhaust gas from said melting furnace through first said rotary furnace and then said shaft furnace for continuously preheating scrap in said rotary furnace and said shaft furnace, said scrap having a surface;

maintaining said bottom side outlet of said shaft furnace in a temperature range not less than temperature of occurrence of fusion of said scrap surface;

maintaining said bottom side outlet of said rotary furnace in a temperature range not less than temperature of occurrence of fusion of said scrap surface;

feeding scrap from said bottom side outlet of said rotary furnace into said melting furnace.

12. A process for preheating and melting scrap according to claim 11, said process further comprising the steps of:

providing a combustion tower;

feeding said exhaust gas after its use for preheating scrap into said combustion tower;

heating said exhaust gas feed into said combustion tower with combustion gas to a temperature not less than 800° C., with said exhaust gas feed into said combustion tower containing a concentration of CO gas of up to 500 ppm;

cooling said exhaust gas heated in said combustion tower with water at a cooling rate of not less than 800° C./sec to a temperature range of 150° C. to 200° C. in a state without dew after said cooling.

13. A process for preheating and melting scrap according to claim 11, said process further comprising the steps of:

providing a cooling tower;

feeding said exhaust gas after its use for preheating into said cooling tower;

cooling said exhaust gas feed into said cooling tower to up to 100° C. in said cooling tower;

providing a dust collector;

feeding said exhaust gas cooled in said cooling tower into said dust collector.

14. A process for preheating and melting scrap according to claim 11, said process further comprising the steps of:

preheating 30% to 70% of total scrap in a succeeding charge with exhaust gas from a preceding charge in the melting furnace;

tapping said preceding charge from said melting furnace;

charging said preheated 30% to 70% of total scrap in said succeeding charge into said melting furnace;

inserting an electrode into said melting furnace to melt said preheated 30% to 70% of total scrap in said succeeding charge using exhaust gas produced for preheating remaining total scrap in said succeeding charge;

charging said preheated remaining total scrap of said succeeding charge into said melting furnace.

15. A process for preheating and melting scrap according to claim 11, said process further comprising the steps of:

initiating melting scrap charged into the melting furnace with an electrode;

withdrawing the electrode from the melting furnace upon occurrence of at least one of (I) melted scrap forming a flat bath state and (ii) at least 40% of said scrap is melted with a top of solid scrap disappearing under melted scrap;

after withdrawing the electrode, commencing blowing oxygen into the melting furnace through at least one of a lance and a tuyere while adding carbon material for melting remaining solid scrap;

stopping adding carbon material and continuously decarburizing the melted scrap by blowing oxygen.

16. A process for preheating and melting scrap according to claim 11, said process further comprising the steps of:

maintaining scrap containing organic material up to 100° C.;

charging said scrap containing organic material into said melting furnace maintained at a temperature of not less than 1300° C.;

recovering exhaust gas from said melting furnace in a non-combusting state.

17. A process for preheating and melting scrap according to claim 13 wherein dust concentration in said exhaust gas prior to feeding into said dust collector is 40 to 400 g/Nm³.

* * * * *

UNITED STATES PATENT AND TRADEMARK OFFICE
CERTIFICATE OF CORRECTION

PATENT NO. : 5,889,810
DATED : March 30, 1999
INVENTOR(S) : Hiroyuki KATAYAMA, et al.

It is certified that error appears in the above-identified patent and that said Letters Patent is hereby corrected as shown below:

Column 2, line 4, change "a exhaust" to --an exhaust--.

Column 9, line 29, change "a exhaust" to --an exhaust--.

Column 13, line 55, change "of introducing" to --for introducing--.

Signed and Sealed this

Twenty-third Day of May, 2000

Attest:

Q. TODD DICKINSON

*Attesting Officer*   *Director of Patents and Trademarks*